(12) United States Patent
DelMarco et al.

(10) Patent No.: US 11,810,309 B2
(45) Date of Patent: Nov. 7, 2023

(54) MULTI-CAMERA SYSTEM FOR ALTITUDE ESTIMATION

(71) Applicant: BAE Systems Information and Electronic Systems Integration Inc., Nashua, NH (US)

(72) Inventors: Stephen P. DelMarco, North Andover, MA (US); Victor T. Tom, Bedford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 368 days.

(21) Appl. No.: 17/131,219

(22) Filed: Dec. 22, 2020

(65) Prior Publication Data

US 2022/0198692 A1     Jun. 23, 2022

(51) Int. Cl.
*G06T 7/55*     (2017.01)
*G06T 7/30*     (2017.01)
(Continued)

(52) U.S. Cl.
CPC ............. *G06T 7/55* (2017.01); *G01C 5/005* (2013.01); *G01C 21/04* (2013.01); *G06T 7/30* (2017.01);
(Continued)

(58) Field of Classification Search
CPC ................................. G06T 7/55; G06T 7/30
(Continued)

(56) References Cited

U.S. PATENT DOCUMENTS

| 7,499,775 B2 | 3/2009 | Filippov et al. |
| 8,355,834 B2 | 1/2013 | Duggan et al. |

(Continued)

FOREIGN PATENT DOCUMENTS

WO     2014152254     9/2014

OTHER PUBLICATIONS

Delmarco S. et al., "A Progressive Refinement Approach to Aerial Image Registration Using Local Transform Perturbations", Proceedings IEEE Int. Geoscience and Remote Sensing Symp. pp. II-1100-II-1103, 2008, 4 pages.

(Continued)

*Primary Examiner* — Amir Shahnami
(74) *Attorney, Agent, or Firm* — Finch & Maloney PLLC; Gary McFaline

(57) ABSTRACT

Techniques are provided for vision-based altitude estimation using one or more platform mounted cameras. An embodiment includes generating projected ground imagery of imagery provided by cameras of the platform, the projection based on a hypothesized altitude. The method also includes obtaining reference ground imagery based on the location of the platform, the location based on platform navigation data. The method further includes registering the projected ground imagery to the reference ground imagery and generating a match score associated with the registration. The method further includes selecting the hypothesized altitude as the estimated altitude based on the match score (e.g., if the match score exceeds a threshold value or is maximized over a set of hypothesized altitudes. The method may further include otherwise adjusting the hypothesized altitude and repeating the altitude estimation process based on the adjusted hypothesized altitude to search for an improved estimated altitude based on the match score.

17 Claims, 9 Drawing Sheets

(51) Int. Cl.
H04N 23/90 (2023.01)
G01C 21/04 (2006.01)
G01C 5/00 (2006.01)
G06T 7/70 (2017.01)

(52) U.S. Cl.
CPC ............... *G06T 7/70* (2017.01); *H04N 23/90* (2023.01); *G06T 2207/10032* (2013.01); *G06T 2207/30244* (2013.01)

(58) Field of Classification Search
USPC ....................................................... 348/135
See application file for complete search history.

(56) References Cited

U.S. PATENT DOCUMENTS

| 8,666,661 | B2 | 3/2014 | Higgins | |
|---|---|---|---|---|
| 8,855,846 | B2 | 10/2014 | Grzywna | |
| 8,918,230 | B2 | 12/2014 | Chen et al. | |
| 10,445,616 | B2 | 10/2019 | Tom et al. | |
| 2011/0046784 | A1 | 2/2011 | Anderson | |
| 2011/0282580 | A1* | 11/2011 | Mohan | G01S 19/485 701/472 |
| 2015/0317527 | A1 | 11/2015 | Graumann et al. | |
| 2016/0018224 | A1 | 1/2016 | Isler et al. | |
| 2017/0357858 | A1* | 12/2017 | Mendonca | G06V 10/757 |

OTHER PUBLICATIONS

Delmarco S., "Progress in Multi-Channel Image Fusion for Face Image Matching", Proceedings of SPIE 8755, Mobile Multimedia/Image Processing, Security, and Applications 2013, May 28, 2013, 13 pages.

Delmarco S. et al., "A Verification Metric for Multi-Sensor Image Registration", Proceedings of SPIE 6567, Signal Processing, Sensor Fusion, and Target Recognition XVI, May 10, 2007, 13 pages.

Choudhry A.J. et al., "Real-time flight altitude estimation using phase correlation with Gram polynomial decimation", Proceedings of SPIE 10338, Thirteenth International Conference on Quality Control by Artificial Vision 2017, May 14, 2017, 8 pages.

Kim J.H. et al., "Multi-UAV-based stereo vision system without GPS for ground obstacle mapping to assist path planning of UGV", Electronic Letters, vol. 50, Sep. 25, 2014, pp. 1431-1432.

Eynard D. et al., "UAV altitude estimation by mixed stereoscopic vision", Proceedings of IEEE/RSJ International Conference on Intelligent Robots and Systems, Oct. 2010, pp. 646-651.

Zhang L. et al., "Vision-based target three-dimensional geolocation using unmanned aerial vehicles", IEEE Transactions on Industrial Electronics, vol. 65, Oct. 2018, pp. 8052-8061.

Beyeler A. Beyeler et al., "Vision-based altitude and pitch estimation for ultra-light indoor microflyers", Proceedings of IEEE Intnational Conference on Robotics and Automation, pp. 2836-2841, 2006.

Cherian A. Cherian et al., "Autonomous altitude estimation of a UAV using a single onboard camera", Proc. IEEE/ RSJ Int'l Conf. Intell. Robots and Sys., pp. 3900-3905, 2009.

Zhang R. et al., "Vision-based relative altitude estimation of small unmanned aerial vehicles in target localization", Proceeding of American Control Confernce, 2011 American Control Conference, 2011, pp. 4622-4627.

Delmarco S. et al., "Spectrally-shaped correlation with application to image registration", Proceedings of SPIE 10993, Mobile Multimedia/Image Processing, Security, and Applications 2019, May 13, 2019, 13 pages.

Pratt W.K., "Correlation Techniques for Image Registration", IEEE Transactions on Aerospace and Electronic Systems, vol. AES-10, May 3, 1974, pp. 353-358.

Kuglin C.D. and D.C. Hines, "The Phase Correlation Image Alignment Method", Proceedings of IEEE Intnational Conference Cybernet and Society, 1975, pp. 163-165.

Delmarco S., "Multiple Template-Based Image Matching Using Alpha-Rooted Quaternion Phase Correlation", Proceedings of SPIE, vol. 7708, Apr. 28, 2010, 12 pages.

Delmarco S., "Multi-Template Image Matching Using Alpha-Rooted Biquaternion Phase Correlation with Application to Logo Recognition", Proceedings of SPIE, vol. 8063, May 26, 2011, 13 pages.

\* cited by examiner

MULTI-CAMERA SYSTEM FOR ALTITUDE ESTIMATION

FIELD OF DISCLOSURE

The present disclosure relates to altitude estimation, and more particularly, to multi-camera systems for vision-based altitude estimation.

BACKGROUND

Aerial vehicle altitude measurement is important for platform navigation. Global Positioning Systems (GPS) can provide high accuracy altitude measurements, but under certain conditions GPS may be unavailable. For example, GPS may be denied in hostile environments due to signal jamming, and other factors such as signal occlusion or multipath effects can render GPS unavailable. Barometric altimeters can provide an alternative to GPS-based altitude measurement, but they can be subject to significant accuracy degradation due to atmospheric temperature and pressure variations and can also drift over long duration flights.

Figure 1:
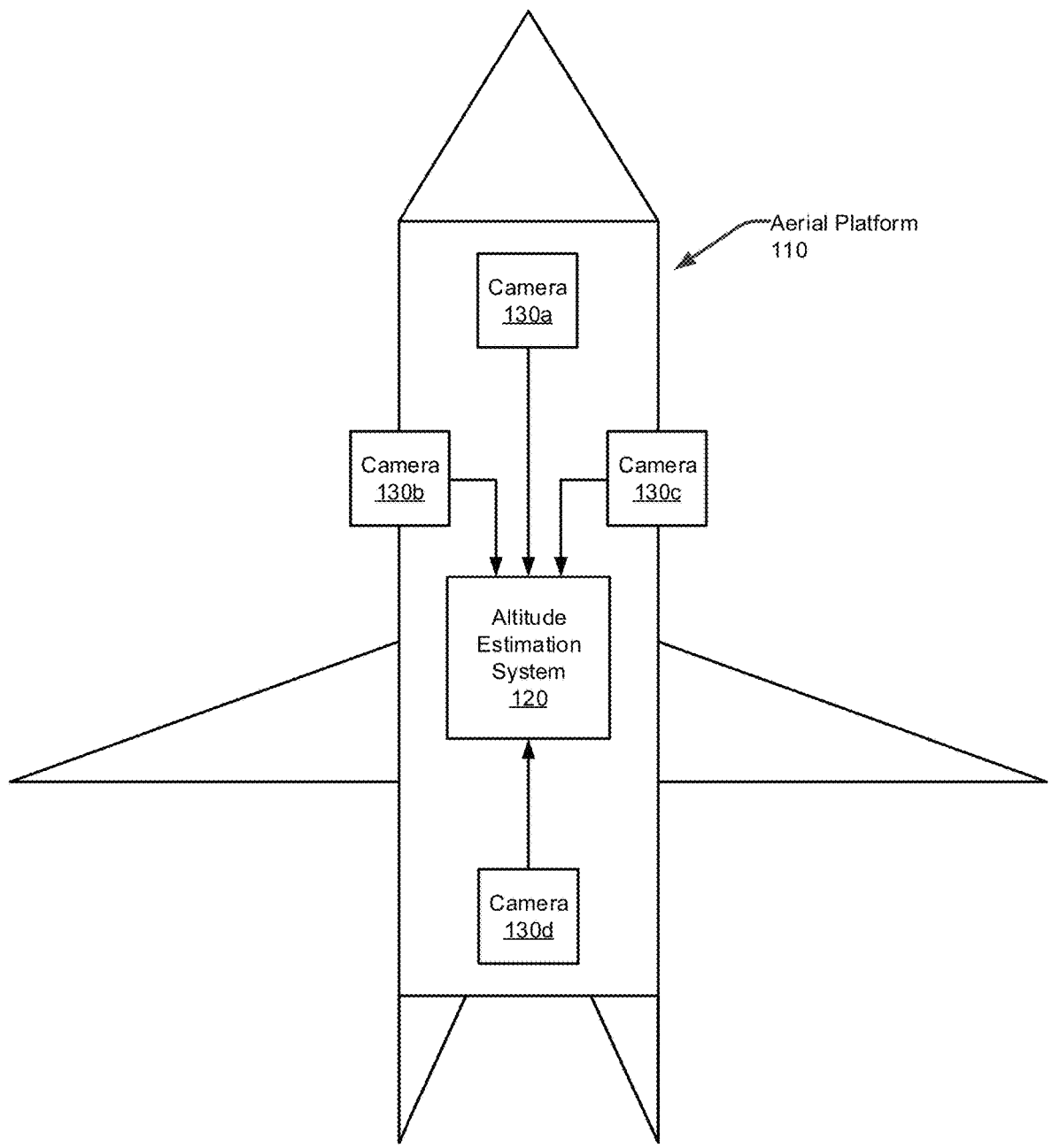
FIG. 1 illustrates an aerial platform configured with a vision based altitude estimation system, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided for vision-based altitude estimation using one or more platform mounted cameras. As noted previously, altitude estimation for aerial vehicles is an important component of platform navigation, and existing techniques such as GPS and barometric based measurement are not always available or reliable. To this end, and in accordance with an embodiment of the present disclosure, cameras are mounted on the aerial platform to provide images of the ground, over which the platform is flying, which can then be registered to known geo-located reference imagery. The registration process is based on a hypothesized altitude and the registration match improves as the hypothesized altitude approaches the real altitude. Thus, the altitude estimation problem is reformulated as a ground plane image registration problem, to which highly accurate (e.g., pixel-level accuracy) registration techniques can be applied. The disclosed techniques exploit the fact that a linear mapping exists between altitude variation and ground plane distance in images obtained from cameras mounted at some nonzero angular offset relative to a vertical axis through the platform, as will be explained in greater detail below. Numerous applications and variations will be appreciated.

For example, a system to implement the disclosed techniques can be hosted on, or otherwise be incorporated into an aircraft, the electronic systems of the aircraft, a personal computer, workstation, laptop computer, tablet, touchpad, portable computer, handheld computer, cellular telephone, smartphone, messaging device, or embedded system, to name just a few possibilities. In accordance with an embodiment, a methodology to implement these techniques includes generating a projected ground image of an image provided by a camera of the aerial platform, wherein the projection is based on a hypothesized altitude. The method also includes obtaining a reference ground image, for example from a reference image database or other suitable source (e.g., any local and/or remote storage facility, a live feed, or any another source accessible to the methodology or system), based on the estimated location of the platform. The estimated location of the platform may be provided, for example, by a platform navigation system. The method further includes registering the projected ground image to the reference ground image and generating a match score associated with the registration. The method further includes selecting the hypothesized altitude as the estimated altitude if the match score exceeds a threshold value, or if the match score is maximized over a set of altitude hypotheses. The method further includes adjusting the hypothesized altitude if the match score does not exceed the threshold value and repeating the altitude estimation process based on the adjusted hypothesized altitude until the match score exceeds the threshold value, or the match score is maximized over the set of altitude hypotheses, or a time limit is exceeded.

It will be appreciated that the techniques described herein may provide improved systems and methods for altitude estimation, compared to systems that rely on GPS, which is not always available, or barometric techniques, which can be subject to relatively large errors. The disclosed techniques can provide a relatively low cost and high accuracy solution to the altitude estimation problem which can be used as an alternative or as a supplement to existing techniques. Numerous embodiments and applications will be apparent in light of this disclosure.

System Architecture

FIG. 1 illustrates an aerial platform 110 configured for vision based altitude estimation, in accordance with certain embodiments of the present disclosure. An aerial platform 110 is shown to include an altitude estimation system 120 and one or more cameras 130. Aerial platform 110 may be an aircraft, a drone, an unmanned aerial vehicle, a precision guided munition, or a projectile of any type. In FIG. 1, cameras 130*b* and 130*c* are side-looking cameras, camera 130*a* is a forward-looking camera and camera 130*d* is a rear-looking camera. The cameras are configured to provide a view of different, though possibly overlapping, regions of the ground in the fly-over area. The cameras may be mounted at different angular offsets relative to the platform, in a range from greater than zero degrees to less than ninety degrees, where zero degree is directed to the ground and ninety degrees is directed to the horizon. In some embodiments, the camera angles range from 35° to 55°. The cameras may be configured to provide images of the ground in any suitable spectrum, including visible light, infrared, and ultraviolet, for example.

In some embodiments, the system may be employed for underwater navigation to determine distance from a watercraft of any type (whether a submersible of surface craft) to the seafloor.

Figure 2:
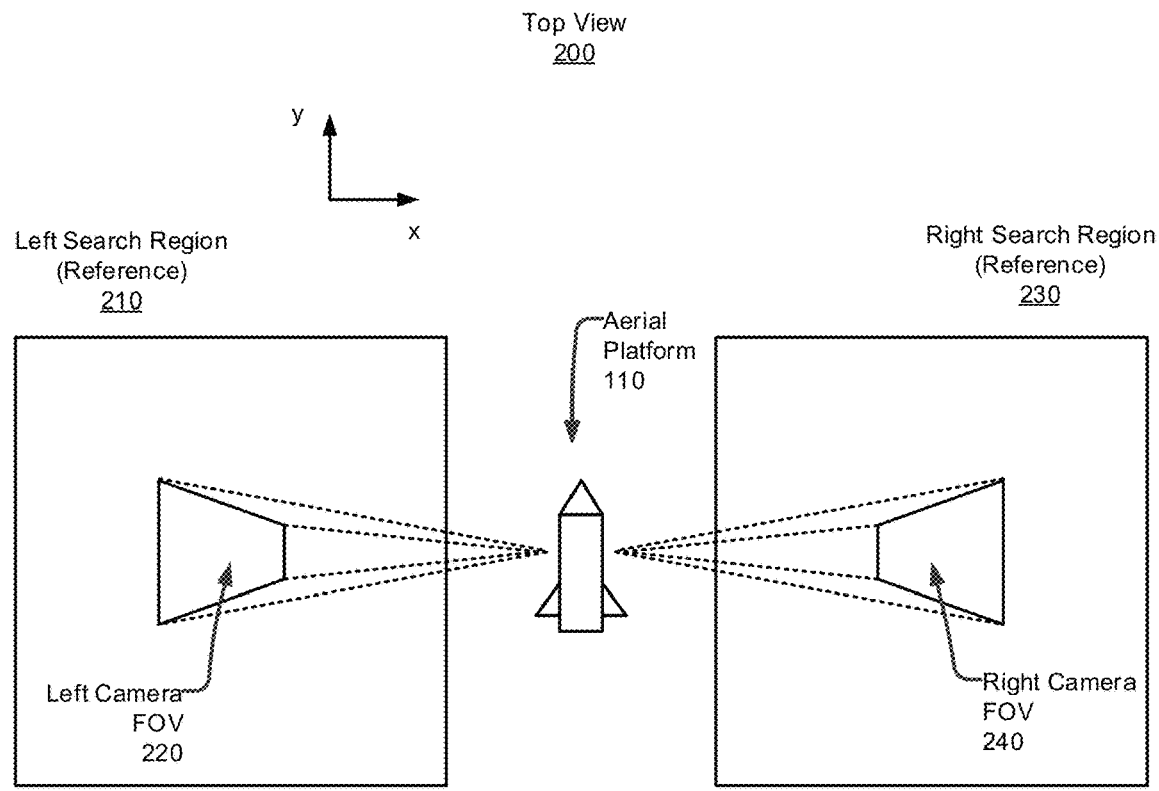
FIG. 2 illustrates example search regions and camera fields of view, in accordance with certain embodiments of the present disclosure.
Figure 2:
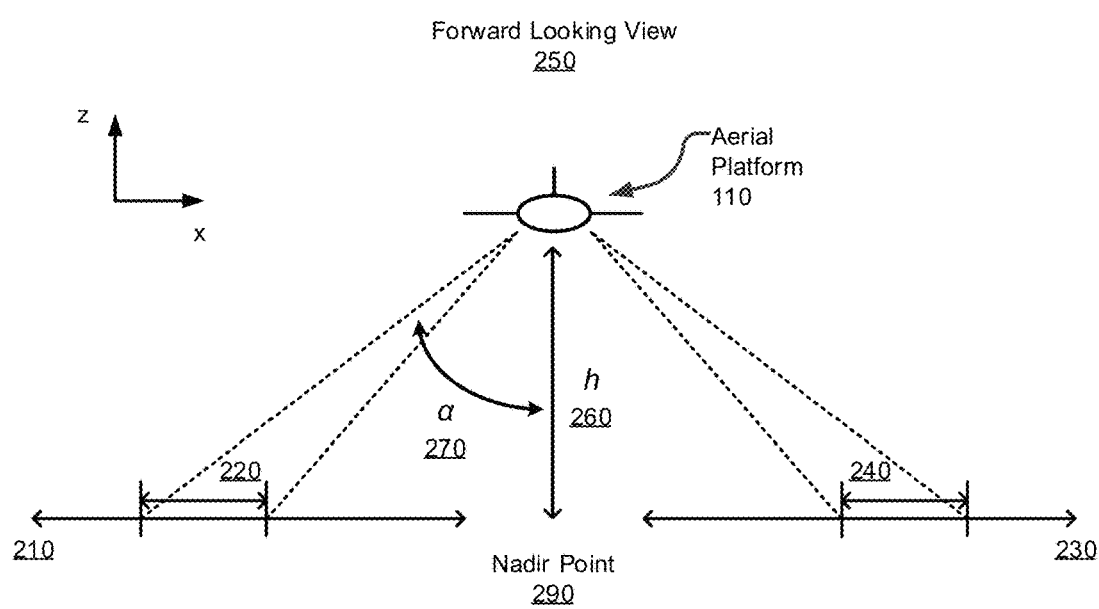

FIG. 2 illustrates search regions and camera fields of view, in accordance with certain embodiments of the present disclosure. A top view 200 is shown to illustrate the aerial platform 110 flying in the positive y-axis direction with a left camera 130b imaging a first field of view (FOV) 220 in the negative x-axis direction, and a right camera 130c imaging as second FOV 240 in the positive x-axis direction. Also shown are a left reference search region 210, and a right reference search region 230 which encompass the left camera FOV 220 and the right camera FOV 240, respectively. A forward looking view 250 is also shown to illustrate the aerial platform 110 at an altitude h 260 along the z-axis direction. The camera orientation angle α 270 is also shown. As can be seen again, the FOV 220 is projected into left search region 210 and the FOV 240 is projected into the right search region 230. As will be apparent from these illustrations, for a given camera orientation, a higher altitude will result in FOV 220 shifting to the left and FOV 240 shifting to the right (i.e., further away from the platform nadir ground point 290), while a lower altitude will result in FOV 220 shifting to the right and FOV 240 shifting to the left (i.e., closer in towards the platform nadir ground point 290). Thus, registration of the projected camera ground image FOVs to the reference ground images can be used to estimate the platform altitude, as will be explained in greater detail below.

Figure 3:
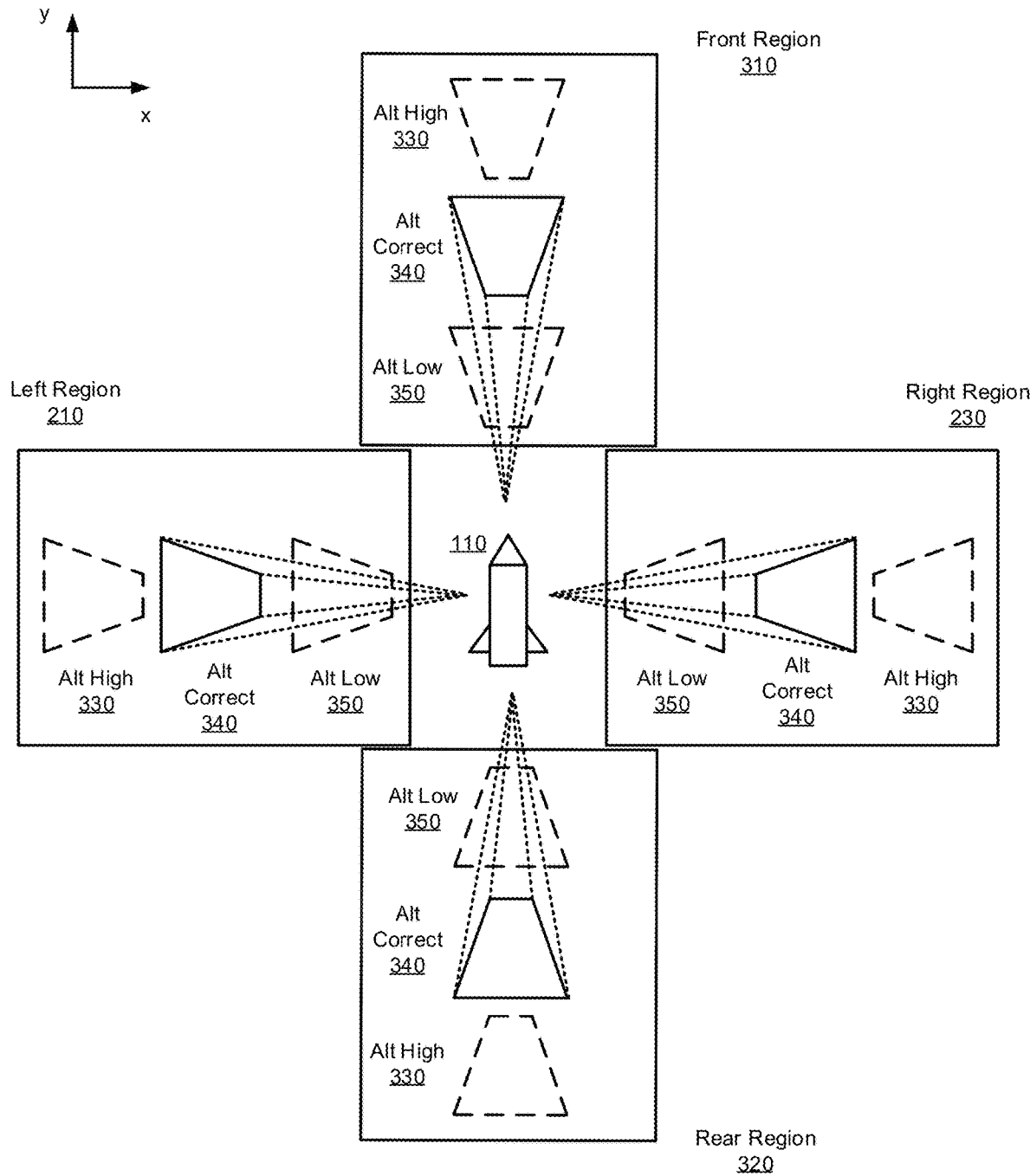
FIG. 3 illustrates effect of altitude on field of view, in accordance with certain embodiments of the present disclosure.

FIG. 3 illustrates, in more detail, the effect of altitude on field of view, in accordance with certain embodiments of the present disclosure. The illustration 300 provides another top-down view of platform 110 flying over terrain in which the left search region 210, the right search region 230, a front search region 310, and a rear search region 320 are shown. Within each region, projected camera FOVs are shown for the case where the estimated altitude is too high 330, the estimated altitude is too low 350, and the estimated altitude is correct 340. In each region, the image registration of the camera FOV to the reference ground image will match up correctly when the estimated altitude is relatively close to the actual altitude. Said differently, if the registration match is poor for a hypothesized altitude, the hypothesized altitude can be adjusted, either up or down, until the registration match improves, at which point the hypothesized altitude can be used as the estimated altitude.

Figure 4:
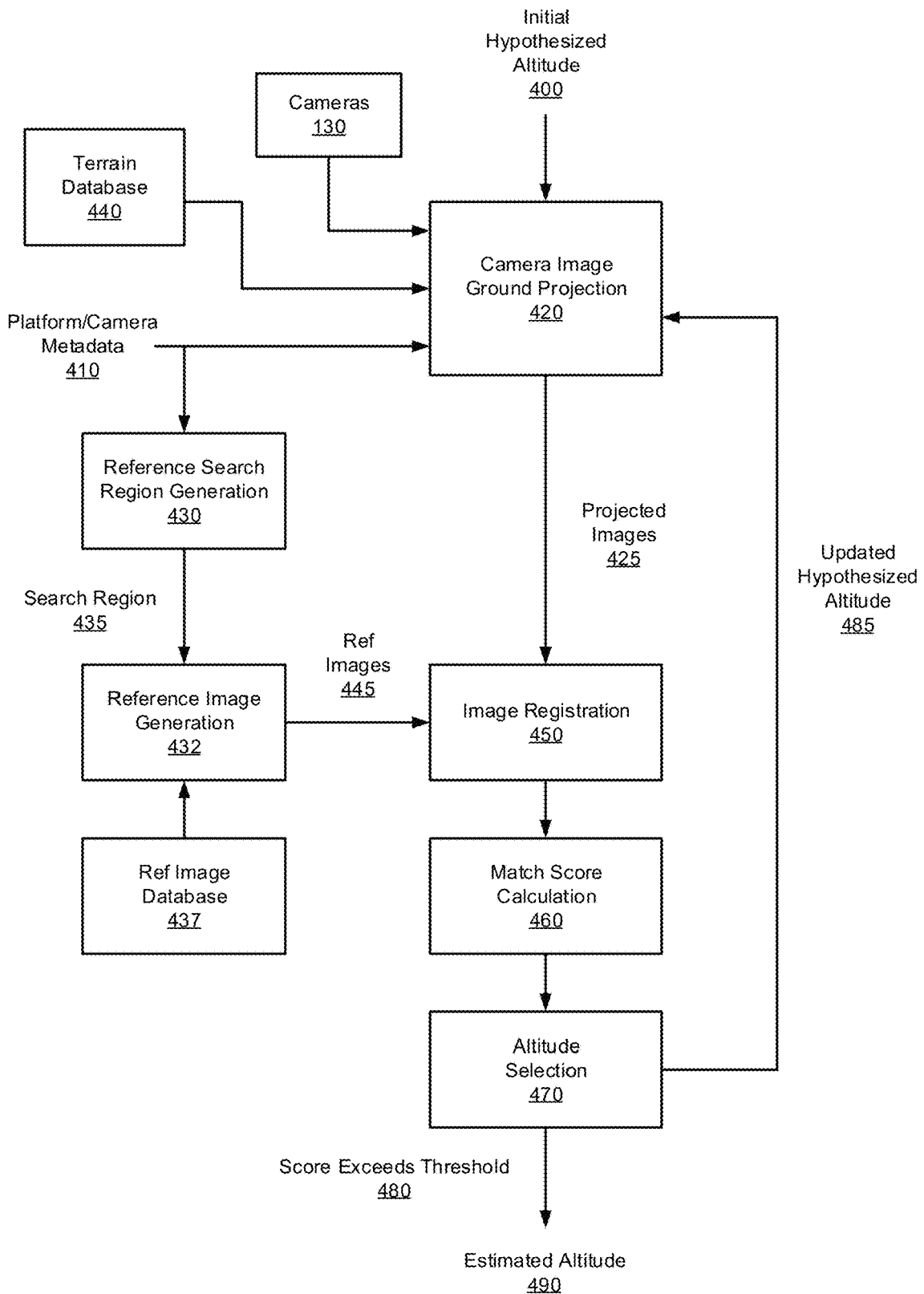
FIG. 4 is a block diagram of an altitude estimation system, configured in accordance with certain embodiments of the present disclosure.

FIG. 4 is a block diagram of an altitude estimation system 120a, configured in accordance with certain embodiments of the present disclosure. The altitude estimation system 120a is shown to include a camera image ground projection circuit 420, a reference search region generation circuit 430, a reference image generation circuit 432, a terrain database 440, a reference image database 437, an image registration circuit 450, a match score calculation circuit 460, and an altitude selection circuit 470.

The camera image ground projection circuit 420 is configured to generate projected ground images 425 based on images provided by a camera 130 of the platform and based on an initial hypothesized altitude 400 or an updated/adjusted hypothesized altitude 485. Platform camera metadata 410 provides information about the orientation/angle of the cameras which is also used to generate the projected ground images. Terrain database 440 provides an estimate of terrain altitude which is also used in the process to generate the projected ground images. Any suitable image projection technique may be used in light of the present disclosure.

The reference search region generation circuit 430 is configured to select a region from which reference ground image data can be obtained based on platform navigation data associated with the platform. The platform navigation system can provide an estimated geo-location for the current platform position as part of the platform/camera metadata 410 (e.g., as an x,y coordinate, latitude/longitude values, or other suitable measure). The estimated geo-location can then be used to generate the search region request 435.

The reference image generation circuit 432 is configured to obtain reference ground images 445 from the reference image database 437 (or another suitable image source) based on the search region 435. In some embodiments, the search region 435 can be used as an index into the reference image database 437. The reference image database 437 is configured to store geo-located ground images and provide them for use as reference images 445 for the altitude estimation process. In some embodiments, the reference image database 437 may comprise satellite ground imagery and/or ground photos taken by aircraft during previous fly-overs. In some embodiments, any suitable source of ground reference imagery may be employed.

The image registration circuit 450 is configured to register the projected ground imagery 425 to the reference ground imagery 445. In some cases, there will be separate reference images 445, one for each projected ground image 425, while in some other cases one reference image 445 may subsume multiple projected ground images 425. Any suitable image registration technique may be used in light of the present disclosure. The match score calculation circuit 460 is configured to generate a match score associated with the registration which indicates how well the projected ground imagery 425 registered to the reference ground imagery 445, for example based on amplitude correlation, phase correlation, spectrally shaped correlation, or other suitable techniques.

In some embodiments, correlation is performed on n camera images against their associated reference images. Each registration produces n correlation surfaces $C_i(x,y)$, for pixel coordinates x,y, where x ranges from 0 to N−1 and y ranges from 0 to M−1, assuming the image is dimensioned as N columns and M rows. Each correlation surface may then be normalized to form a unit energy surface $C_i^{nrm}(x,y)$, as expressed by the following equation:

$$C_i^{nrm} = \frac{C_i}{\sqrt{\sum_{j=0}^{N-1} \sum_{k=0}^{M-1} [C_i(j,k)]^2}}$$

The match score can be calculated as a sum of the zero-shifted normalized correlation coefficients:

$$\text{match score} = \sum_i^n C_i^{nrm}(0,0)$$

As previously described, when the hypothesized altitude corresponds to the true altitude, each camera image aligns with its associated reference image, and in this case, the correlation peak value occurs at the zero-shift index. The zero-shift correlation coefficients add constructively to the match score which provides a large value that serves to identify the correct altitude estimate hypothesis.

In some other embodiments, each camera image may be used as a separate channel in a vector-valued image. For example, a dual-camera system could use complex valued images, in which one image becomes the real part and the other image becomes the imaginary part of the complex valued image. A complex correlation can then be performed, for example, using complex Fourier transforms, to perform the image correlation. Similarly, a quad-camera system could use each of the four images as components of a quaternion-valued image, and the complex correlation can be performed using a quaternion Fourier transform. The zero-shift correlation coefficient (or magnitude value thereof) can then be used as the match score.

The altitude selection circuit 470 is configured to select the hypothesized altitude as the estimated altitude 490 if the match score exceeds a threshold value 480, or if the match score is maximized over the set of altitude hypotheses during the iterations described below. The altitude selection circuit 470 is also configured to generate an updated/adjusted hypothesized altitude 485 if the match score does not exceed the threshold value. The system then repeats/iterates the process for altitude estimation based on the adjusted hypothesized altitude 485 until the match score is maximized.

Figure 5:
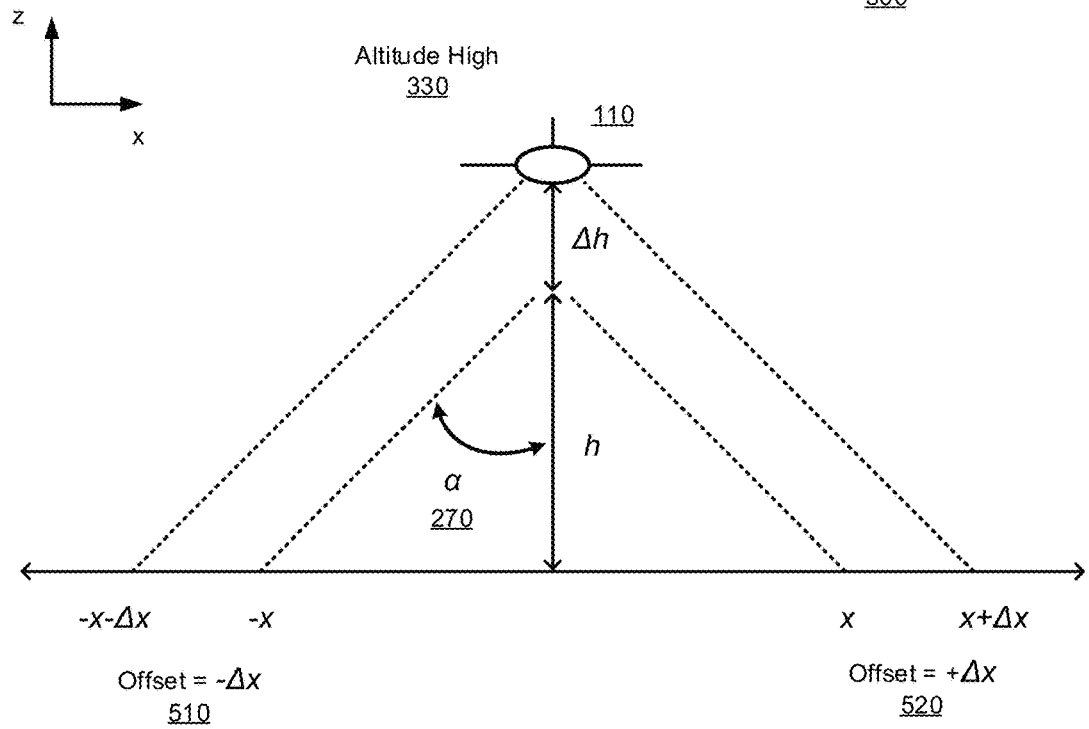
FIG. 5 illustrates effect of altitude error on registration offset, in accordance with certain embodiments of the present disclosure.
Figure 5:
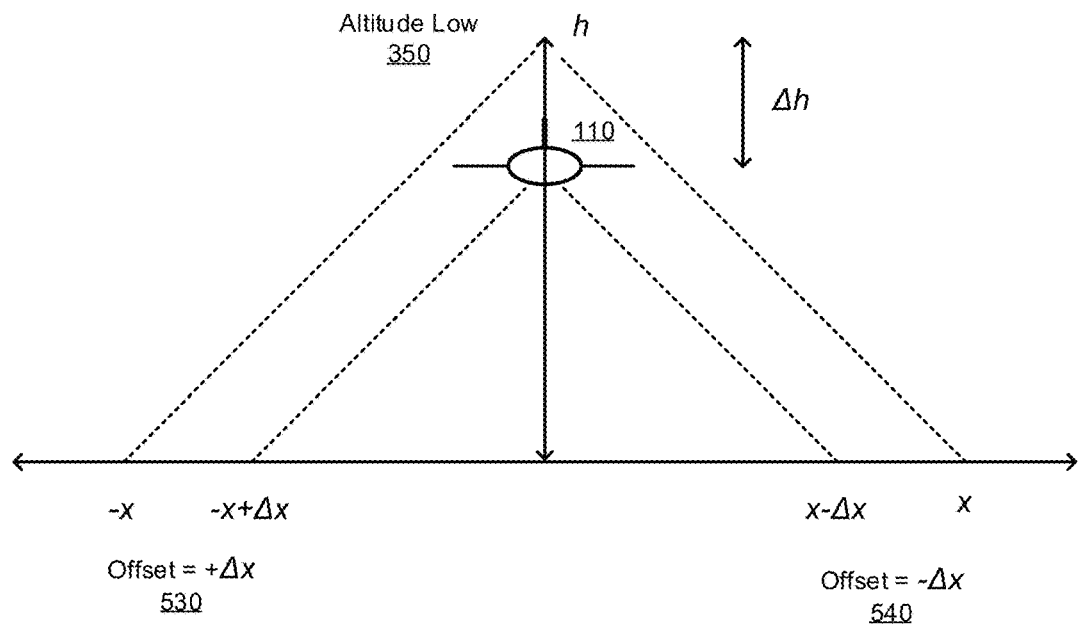

FIG. 5 illustrates the effect of altitude error on registration offset, in accordance with certain embodiments of the present disclosure. As can be seen from the illustration 500, in the case 330 where the altitude is too high by $\Delta h$, the field of view from the left camera is offset by an error value of $-\Delta x$ 510 (i.e., to the left), while the field of view from the right camera is offset by an error value of $+\Delta x$ 520 (i.e., to the right). By contrast, in the case 350 where the altitude is too low by $\Delta h$, the field of view from the left camera is offset by an error value of $+\Delta x$ 530 (i.e., to the right), while the field of view from the right camera is offset by an error value of $-\Delta x$ 540 (i.e., to the left).

A similar effect occurs for the forward looking and rear looking cameras. If the altitude is too high, the field of view from the forward camera is offset by an error value of $+\Delta y$ (i.e., in the forward travel direction), while the field of view from the rear camera is offset by an error value of $-\Delta y$ (i.e., in the reverse travel direction). Similarly, where the altitude is too low, the field of view from the forward camera is offset by an error value of $-\Delta y$ (i.e., in the reverse travel direction), while the field of view from the rear camera is offset by an error value of $+\Delta y$ (i.e., in the forward travel direction).

In some embodiments, the registration process provides an offset value between the projected ground image and the reference ground image, for each camera field of view. The registration offset values can be used to determine whether the hypothesized altitude is too high or too low based on a comparison of the offsets from the different cameras, as described above. This determination can then guide the adjustment to the hypothesized altitude for the next iteration.

The relation between $\Delta h$ and $\Delta x$ can be expressed as:

$$\Delta h = \left(\frac{1}{\tan(\alpha)}\right)\Delta x$$

If $\alpha$ 270 is chosen to be 45 degrees, then $\tan(\alpha)=1$ and there is a one-to-one mapping between changes in altitude and changes in ground-plane distance, which is to say $\Delta h=\Delta x$. In this case, a one-pixel accurate image registration solution over imagery with a one meter ground sample distance will generate altitude estimation accuracies of one meter.

Figure 6:
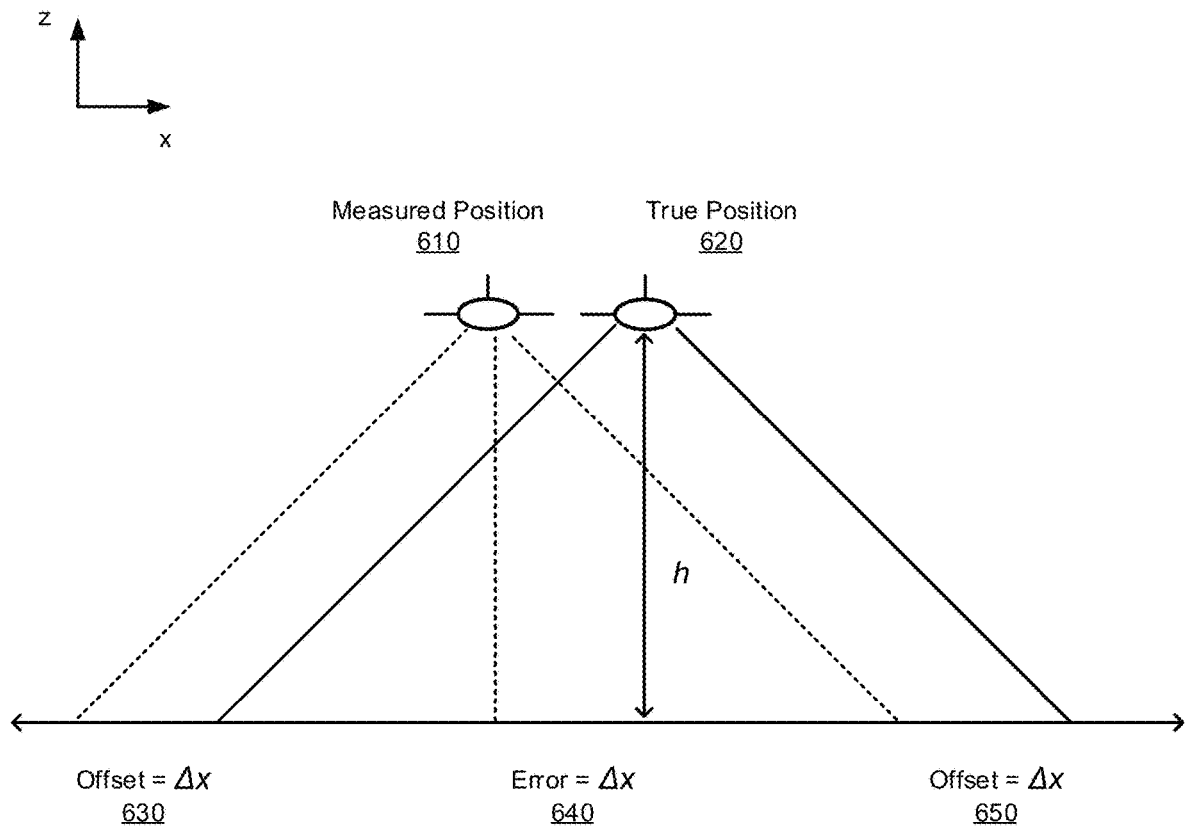
FIG. 6 illustrates effect of lateral position error on registration offset, in accordance with certain embodiments of the present disclosure.

FIG. 6 illustrates the effect of lateral position error on registration offset, in accordance with certain embodiments of the present disclosure. As can be seen from the illustration 600, in some cases the measured position 610 of the platform may differ from the true position 620 by an error increment $\Delta x$ 640 (in the lateral direction along the x-axis). This can occur, for example, due to accuracy limitations with the platform navigation system. Such error will result in the FOV offset for the left camera 630 being the same as the FOV offset for the right camera 650, both of which will be equal to $\Delta x$. Thus, if the registration process provides offset values from the left and right camera FOVs which are equal in magnitude, or at least of the same side, then it can be determined that the offsets are not due to error in the hypothesized altitude.

Figure 7:
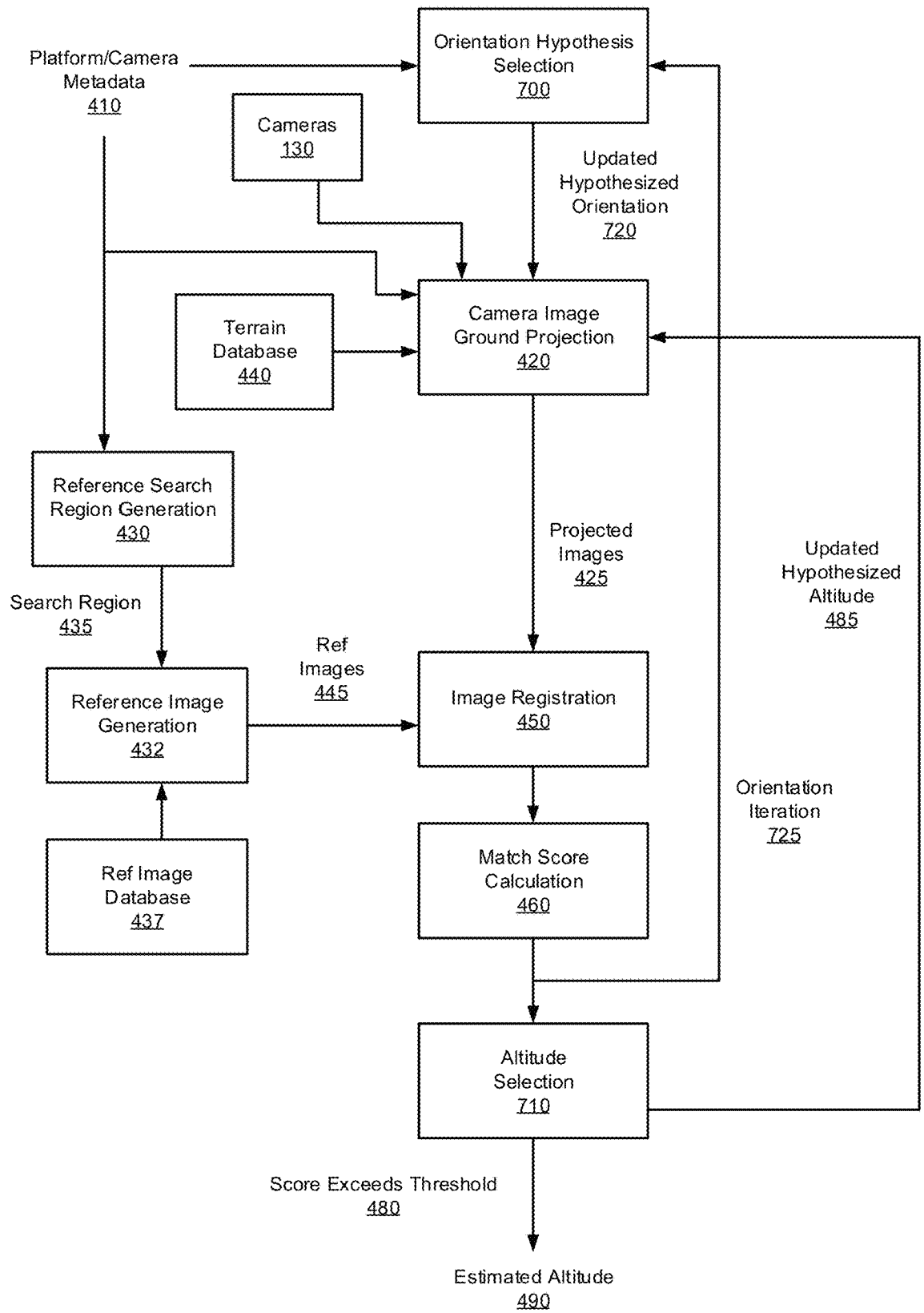
FIG. 7 is a block diagram of an altitude estimation system, configured in accordance with certain other embodiments of the present disclosure.

FIG. 7 is a block diagram of an altitude estimation system 120b, configured in accordance with certain other embodiments of the present disclosure. Altitude estimation system 120b is similar to system 120a but includes additional functionality to iterate on hypothesized camera orientations. As previously described in connection with FIG. 4, platform/camera metadata 410 may supply camera orientation angles to be provided for use in the camera image ground projection process. This metadata, however, may be subject to errors in some cases. To help correct for that possible error, orientation, hypothesis selection circuit 700 is configured to perform the altitude estimation process starting with an initial camera orientation (which may be the provided value 410) and then iterate the process with an adjusted/updated hypothesized orientation 720. The process iterates over multiple hypothesized orientations 725 and multiple hypothesized altitudes 485, until the match score is maximized.

Methodology

Figure 8:
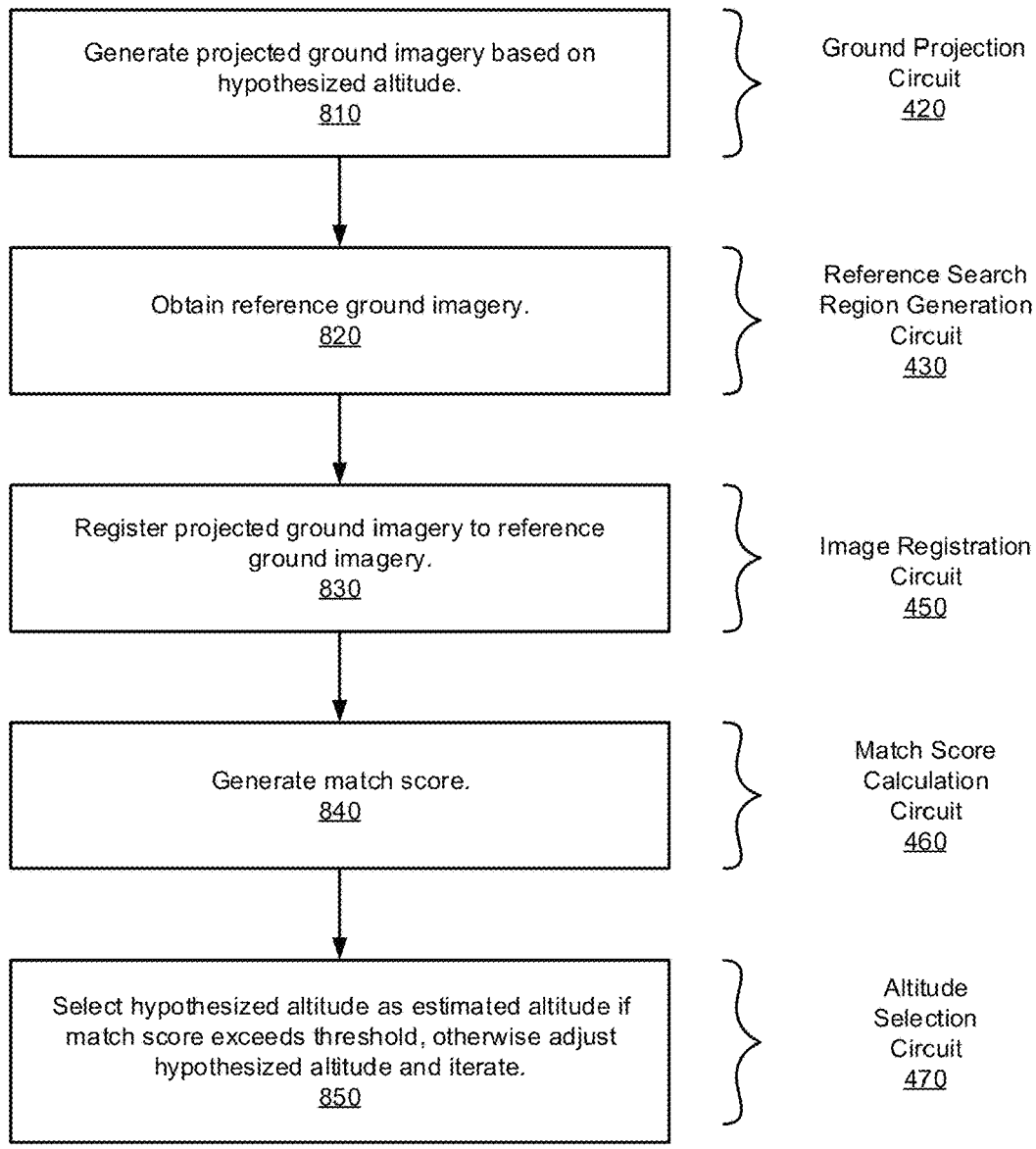
FIG. 8 is a flowchart illustrating a methodology for vision based altitude estimation, in accordance with an embodiment of the present disclosure.

FIG. 8 is a flowchart illustrating a methodology 800 for vision based altitude estimation, in accordance with an embodiment of the present disclosure. As can be seen, example method 800 includes a number of phases and sub-processes, the sequence of which may vary from one embodiment to another. However, when considered in aggregate, these phases and sub-processes form a process for altitude estimation, in accordance with certain of the embodiments disclosed herein. These embodiments can be implemented, for example using the system architecture illustrated in FIGS. 1, 4, and 7, as described above. However other system architectures can be used in other embodiments, as will be apparent in light of this disclosure. To this end, the correlation of the various functions shown in FIG. 8 to the specific components illustrated in FIGS. 1, 4, and 7, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 800 commences, at operation 810, by generating projected ground imagery based on images provided by one or more cameras that are mounted on the platform. The ground projection is based on a hypothesized altitude and data about the position and orientation of the cameras.

Next, at operation 820, reference ground imagery is obtained based on navigation data associated with the platform. In some embodiments, the reference ground imagery may be obtained from a reference image database based on a known or estimated location of the platform provided by the navigation data. The reference image database contains geo-located images of the fly-over region.

At operation 830, the projected ground imagery is registered to the reference ground imagery.

At operation 840, a match score is generated for the registration. In some embodiments, the generation of the match score is based on a correlation of the projected ground imagery and the reference ground imagery.

At operation 850, the hypothesized altitude is selected as the estimated altitude if the match score exceeds a threshold value or is maximized over the set of altitude hypotheses, otherwise, the hypothesized altitude is adjusted, and the process is repeated based on the adjusted hypothesized altitude until the match score exceeds the threshold value or is maximized over the set of altitude hypotheses. In some embodiments, the adjustments are made so that a range of hypothesized altitudes are searched in a linear manner. In some embodiments, the adjustments are made to provide a hierarchical search strategy from coarse adjustments to fine adjustments. In still other embodiments, the adjustments are made using a bracketing algorithm with interval by section which may provide faster convergence.

Of course, in some embodiments, additional operations may be performed, as previously described in connection with the system. These additional operations may include, for example, generating image offsets as part of the registration process and adjusting the hypothesized altitude based on a comparison of the offsets associated with different cameras. In some embodiments, the process may be repeated for a range of hypothesized camera orientations to compensate for the fact that camera orientation data may contain errors.

Example System

Figure 9:
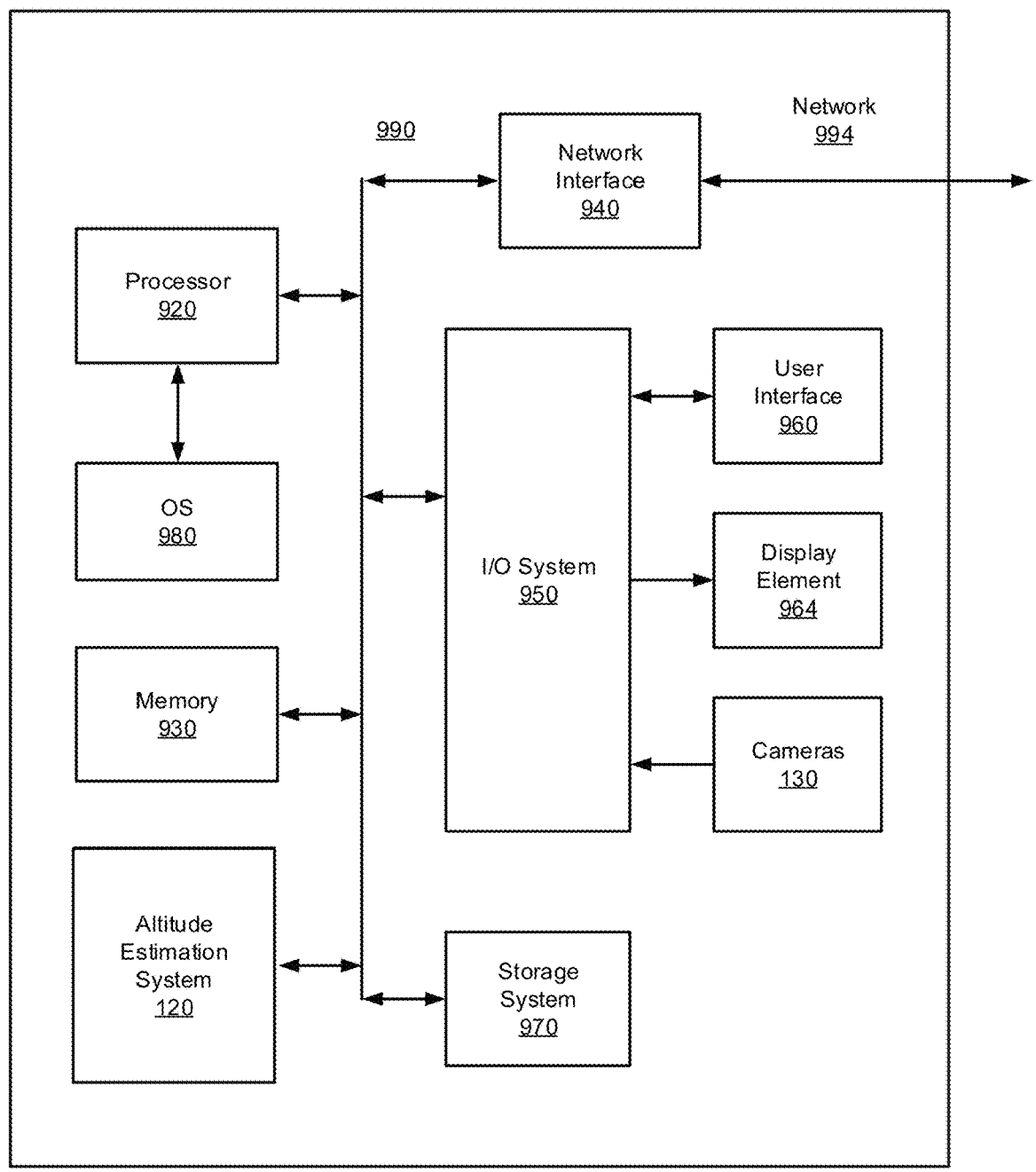
FIG. 9 is a block diagram schematically illustrating a processing platform configured to perform vision based altitude estimation, in accordance with an embodiment of the present disclosure.

FIG. 9 is a block diagram schematically illustrating a processing platform 900 configured to perform vision based altitude estimation, in accordance with an embodiment of the present disclosure. In some embodiments, platform 900, or portions thereof, may be hosted on, or otherwise be incorporated into an aircraft, the electronic systems of the aircraft, a personal computer, workstation, laptop computer, tablet, touchpad, portable computer, handheld computer, cellular telephone, smartphone, messaging device, embedded system, or any other suitable platform. Any combination of different devices may be used in certain embodiments.

In some embodiments, platform 900 may comprise any combination of a processor 920, a memory 930, altitude estimation system 120, a network interface 940, an input/output (I/O) system 950, a user interface 960, a display element 964, a storage system 970, and cameras 130. As can be further seen, a bus and/or interconnect 990 is also provided to allow for communication between the various components listed above and/or other components not shown. Platform 900 can be coupled to a network 994 through network interface 940 to allow for communications with other computing devices, platforms, devices to be controlled, or other resources. Other componentry and functionality not reflected in the block diagram of FIG. 9 will be apparent in light of this disclosure, and it will be appreciated that other embodiments are not limited to any particular hardware configuration.

Processor 920 can be any suitable processor, and may include one or more coprocessors or controllers, such as an audio processor, a graphics processing unit, or hardware accelerator, to assist in control and processing operations associated with platform 900. In some embodiments, the processor 920 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 920 may be implemented as a complex instruction set computer (CISC) or a reduced instruction set computer (RISC) processor. In some embodiments, processor 920 may be configured as an x 86 instruction set compatible processor.

Memory 930 can be implemented using any suitable type of digital storage including, for example, flash memory and/or random-access memory (RAM). In some embodiments, the memory 930 may include various layers of memory hierarchy and/or memory caches. Memory 930 may be implemented as a volatile memory device such as, but not limited to, a RAM, dynamic RAM (DRAM), or static RAM (SRAM) device. Storage system 970 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 970 may comprise technology to increase the storage performance enhanced protection for valuable digital media when multiple hard drives are included.

Processor 920 may be configured to execute an Operating System (OS) 980 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 900, and therefore may also be implemented using any suitable existing or subsequently-developed platform.

Network interface circuit 940 can be any appropriate network chip or chipset which allows for wired and/or wireless connection between other components of platform 900 and/or network 994, thereby enabling platform 900 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 950 may be configured to interface between various I/O devices and other components of platform 900. I/O devices may include, but not be limited to, user interface 960 and display element 964. User interface 960 may include devices (not shown) such as a touchpad, keyboard, and mouse, etc., for example, to allow the user to control the system. Display element 964 may be configured to display camera images, navigation data, or other suitable information. I/O system 950 may include a graphics subsystem configured to perform processing of images for rendering on the display element 964. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 920 or any chipset of platform 900.

It will be appreciated that in some embodiments, the various components of platform 900 may be combined or integrated in a system-on-a-chip (SoC) architecture. In some embodiments, the components may be hardware components, firmware components, software components or any suitable combination of hardware, firmware or software.

Altitude estimation system 120 is configured to perform vision based altitude estimation using image registration techniques, as described previously. Altitude estimation system 120 may include any or all of the circuits/components illustrated in FIGS. 1, 4, and 7, as described above. These components can be implemented or otherwise used in conjunction with a variety of suitable software and/or hardware that is coupled to or that otherwise forms a part of platform 900. These components can additionally or alternatively be implemented or otherwise used in conjunction with user I/O devices that are capable of providing information to, and receiving information and commands from, a user.

In some embodiments, these circuits may be installed local to platform 900, as shown in the example embodiment of FIG. 9. Alternatively, platform 900 can be implemented in a client-server arrangement wherein at least some functionality associated with these circuits is provided to platform 900 using an applet, such as a Java applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 994 or remotely coupled to network 994 by one or more other networks and/or communication channels. In some cases, access to resources on a given network or computing system may require credentials such as usernames, passwords, and/or compliance with any other suitable security mechanism.

In various embodiments, platform 900 may be implemented as a wireless system, a wired system, or a combination of both. When implemented as a wireless system, platform 900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 900 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 994. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 900 may comprise additional, fewer, or alternative subcomponents as compared to those included in the example embodiment of FIG. 9.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a computer program product including one or more machine-readable mediums encoded with instructions that when executed by one or more processors cause a process to be carried out for altitude estimation of a platform, the process comprising: generating projected ground imagery based on imagery provided by a camera of the platform and based on a hypothesized altitude; obtaining reference ground imagery based on navigation data associated with the platform; registering the projected ground imagery to the reference ground imagery; generating a match score associated with the registration; and selecting the hypothesized altitude as the estimated altitude based on the match score.

In some cases, the process further comprises adjusting the hypothesized altitude and repeating the process for altitude estimation based on the adjusted hypothesized altitude to search for an improved estimated altitude. In some cases, the camera is a first camera, the projected ground imagery is a first projected ground image, the reference ground imagery is a first reference ground image, the registration is a first registration, and the process further comprises: generating a second projected ground image based on an image provided by a second camera of the platform and based on the hypothesized altitude; obtaining a second reference ground image based on navigation data associated with the platform; and performing a second registration to register the second projected ground image to the second reference ground image, wherein the generated match score is associated with the first registration and the second registration. In some such cases, the first registration generates a first image offset and the second registration generates a second image offset, and the process further comprises adjusting the hypothesized altitude based on a comparison of the first image offset with the second image offset. In some cases, the generation of the match score is based on a correlation of the projected ground imagery and the reference ground imagery. In some cases, the projected ground imagery is further based on a hypothesized camera orientation and the process further comprises adjusting the hypothesized camera orientation based on the match score and repeating the process for altitude estimation based on the adjusted hypothesized camera orientation to search for an improved estimated altitude. In some cases, the camera is oriented at an angular offset in a range between 35 degrees to 55 degrees relative to a vertical axis through the platform.

Another example embodiment of the present disclosure provides a system for altitude estimation, the system comprising: an image projection circuit configured to generate projected ground imagery based on imagery provided by a camera of the platform and based on a hypothesized altitude; a reference image circuit configured to obtain reference ground imagery based on navigation data associated with the platform; an image registration circuit configured to register the projected ground imagery to the reference ground imagery; a match score circuit configured to generate a match score associated with the registration; and an altitude selection circuit configured to select the hypothesized altitude as the estimated altitude based on the match score.

In some cases, the altitude selection circuit is further configured to adjust the hypothesized altitude and repeating the process for altitude estimation based on the adjusted hypothesized altitude to search for an improved estimated altitude. In some cases, the camera is a first camera, the projected ground imagery is a first projected ground image, the reference ground imagery is a first reference ground image, the registration is a first registration, and: the image projection circuit is configured to generate a second projected ground image based on an image provided by a second camera of the platform and based on the hypothesized altitude; the reference image circuit is configured to obtain a second reference ground image based on navigation data associated with the platform; and the image registration circuit is configured to perform a second registration to register the second projected ground image to the second reference ground image, wherein the generated match score is associated with the first registration and the second registration. In some such cases, the image registration circuit is configured to generate a first image offset associated with the first registration and to generate a second image offset associated with the second registration, and the altitude selection circuit is configured to adjust the hypothesized altitude based on a comparison of the first image offset with the second image offset. In some cases, the generation of the match score is based on a correlation of the projected ground imagery and the reference ground imagery. In some cases, the projected ground imagery is further based on a hypothesized camera orientation and the altitude selection circuit is configured to adjust the hypothesized camera orientation based on the match score and cause the system to repeat the process for altitude estimation based on the adjusted hypothesized camera orientation to search for an improved estimated altitude. In some cases, the camera is oriented at an angular offset in a range between 35 degrees to 55 degrees relative to a vertical axis through the platform.

Another example embodiment of the present disclosure provides a method for altitude estimation, the method comprising: generating, by a processor-based system, projected ground imagery based on imagery provided by a camera of the platform and based on a hypothesized altitude; obtaining, by the processor-based system, reference ground imagery based on navigation data associated with the platform; registering, by the processor-based system, the projected ground imagery to the reference ground imagery; generating, by the processor-based system, a match score associated with the registration; and selecting, by the processor-based system, the hypothesized altitude as the estimated altitude based on the match score. In some cases, the method further comprises adjusting the hypothesized altitude and repeating the process for altitude estimation based on the adjusted hypothesized altitude to search for an improved estimated altitude. In some cases, the camera is a first camera, the projected ground imagery is a first projected ground image, the reference ground imagery is a first reference ground image, the registration is a first registration, and the method further comprises: generating a second projected ground image based on an image provided by a second camera of the platform and based on the hypothesized altitude; obtaining a second reference ground image based on navigation data associated with the platform; and performing a second registration to register the second projected ground image to the second reference ground image, wherein the generated match score is associated with the first registration and the second registration. In some such cases, the first registration generates a first image offset and the second registration generates a second image offset, and the method further comprises adjusting the hypothesized altitude based on a comparison of the first image offset with the second image offset. In some cases, the generation of the match score is based on a correlation of the projected ground imagery and the reference ground imagery. In some cases, the projected ground image is further based on a hypothesized camera orientation and the method further comprises adjusting the hypothesized camera orientation based on the match score and repeating the process for altitude estimation based on the adjusted hypothesized camera orientation to search for an improved estimated altitude.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A computer program product including one or more non-transitory machine-readable mediums encoded with instructions that when executed by one or more processors cause a process to be carried out for altitude estimation of a platform, the process comprising:
    generating a first projected ground image based on imagery provided by a first camera of the platform and based on a hypothesized altitude;
    obtaining a first reference ground image based on navigation data associated with the platform;
    registering the first projected ground image to the first reference ground image;
    generating a second projected ground image based on an image provided by a second camera of the platform and based on the hypothesized altitude;
    obtaining a second reference ground image based on navigation data associated with the platform;
    performing a second registration to register the second projected ground image to the second reference ground image;
    generating a match score associated with the first registration and the second registration; and
    selecting the hypothesized altitude as the estimated altitude based on the match score.

2. The computer program product of claim 1, wherein the process further comprises adjusting the hypothesized altitude and repeating the process for altitude estimation based on the adjusted hypothesized altitude to search for an improved estimated altitude.

3. The computer program product of claim 1, wherein the first registration generates a first image offset and the second registration generates a second image offset, and the process further comprises adjusting the hypothesized altitude based on a comparison of the first image offset with the second image offset.

4. The computer program product of claim 1, wherein the generation of the match score is based on a correlation of the projected ground imagery and the reference ground imagery.

5. The computer program product of claim 1, wherein the projected ground imagery is further based on a hypothesized camera orientation and the process further comprises adjusting the hypothesized camera orientation based on the match score and repeating the process for altitude estimation based on the adjusted hypothesized camera orientation to search for an improved estimated altitude.

6. The computer program product of claim 1, wherein the camera is oriented at an angular offset in a range between 35 degrees to 55 degrees relative to a vertical axis through the platform.

7. A system for altitude estimation, the system comprising:
    an image projection circuit configured to generate projected ground imagery based on imagery provided by a camera of the platform and based on a hypothesized altitude, wherein the camera is oriented at an angular offset in a range between 35 degrees to 55 degrees relative to a vertical axis through the platform;
    a reference image circuit configured to obtain reference ground imagery based on navigation data associated with the platform;
    an image registration circuit configured to register the projected ground imagery to the reference ground imagery;
    a match score circuit configured to generate a match score associated with the registration; and
    an altitude selection circuit configured to select the hypothesized altitude as the estimated altitude based on the match score.

8. The system of claim 7, wherein the altitude selection circuit is further configured to adjust the hypothesized altitude and repeating the process for altitude estimation based on the adjusted hypothesized altitude to search for an improved estimated altitude.

9. The system of claim 7, wherein the camera is a first camera, the projected ground imagery is a first projected ground image, the reference ground imagery is a first reference ground image, the registration is a first registration, and:
    the image projection circuit is configured to generate a second projected ground image based on an image provided by a second camera of the platform and based on the hypothesized altitude;
    the reference image circuit is configured to obtain a second reference ground image based on navigation data associated with the platform; and
    the image registration circuit is configured to perform a second registration to register the second projected ground image to the second reference ground image, wherein the generated match score is associated with the first registration and the second registration.

10. The system of claim 9, wherein the image registration circuit is configured to generate a first image offset associated with the first registration and to generate a second image offset associated with the second registration, and the altitude selection circuit is configured to adjust the hypothesized altitude based on a comparison of the first image offset with the second image offset.

11. The system of claim 7, wherein the generation of the match score is based on a correlation of the projected ground imagery and the reference ground imagery.

12. The system of claim 7, wherein the projected ground imagery is further based on a hypothesized camera orientation and the altitude selection circuit is configured to adjust the hypothesized camera orientation based on the match score and cause the system to repeat the process for altitude estimation based on the adjusted hypothesized camera orientation to search for an improved estimated altitude.

13. A method for altitude estimation, the method comprising:
- generating, by a processor-based system, a first projected ground image based on imagery provided by a first camera of the platform and based on a hypothesized altitude;
- obtaining, by the processor-based system, a first reference ground image based on navigation data associated with the platform;
- registering, by the processor-based system, the first projected ground image to the first reference ground image;
- generating, by the processor-based system, a second projected ground image based on an image provided by a second camera of the platform and based on the hypothesized altitude;
- obtaining, by the processor-based system, a second reference ground image based on navigation data associated with the platform;
- performing, by the processor-based system, a second registration to register the second projected ground image to the second reference ground image, wherein the generated match score is associated with the first registration and the second registration;
- generating, by the processor-based system, a match score associated with the first registration and second registration; and
- selecting, by the processor-based system, the hypothesized altitude as the estimated altitude based on the match score.

14. The method of claim 13, further comprising adjusting the hypothesized altitude and repeating the process for altitude estimation based on the adjusted hypothesized altitude to search for an improved estimated altitude.

15. The method of claim 13, wherein the first registration generates a first image offset and the second registration generates a second image offset, and the method further comprises adjusting the hypothesized altitude based on a comparison of the first image offset with the second image offset.

16. The method of claim 13, wherein the generation of the match score is based on a correlation of the projected ground imagery and the reference ground imagery.

17. The method of claim 13, wherein the projected ground image is further based on a hypothesized camera orientation and the method further comprises adjusting the hypothesized camera orientation based on the match score and repeating the process for altitude estimation based on the adjusted hypothesized camera orientation to search for an improved estimated altitude.

* * * * *